United States Patent [19]

Schneider

[11] Patent Number: 5,259,260
[45] Date of Patent: Nov. 9, 1993

[54] MULTIPLE STEP TRANSMISSION

[75] Inventor: Arthur Schneider, Braunschweig, Fed. Rep. of Germany

[73] Assignee: Volkswagen AG, Wolfsburg, Fed. Rep. of Germany

[21] Appl. No.: 766,565

[22] Filed: Sep. 27, 1991

[30] Foreign Application Priority Data

Oct. 8, 1990 [DE] Fed. Rep. of Germany ....... 4031851

[51] Int. Cl.[5] ............................................. F16H 59/00
[52] U.S. Cl. ...................... 74/331; 74/333; 74/745
[58] Field of Search ............ 74/331, 333, 335, 336 R, 74/745; 364/424.1

[56] References Cited

U.S. PATENT DOCUMENTS

| | | | |
|---|---|---|---|
| 4,497,222 | 2/1985 | Nagaoka et al. | 74/336 R X |
| 4,627,312 | 12/1986 | Fujieda et al. | 74/866 |
| 4,738,147 | 4/1988 | Janiszewski | 74/331 X |
| 4,811,222 | 3/1989 | Watanabe et al. | 364/424.1 |
| 4,957,016 | 9/1990 | Amedei et al. | 74/336 R |
| 4,984,485 | 1/1991 | Kojima et al. | 364/424.1 X |
| 5,094,130 | 3/1992 | Hirose et al. | 74/866 X |
| 5,095,774 | 3/1992 | Takahashi et al. | 364/424.1 X |
| 5,125,294 | 6/1992 | Takashi et al. | 364/424.1 X |

FOREIGN PATENT DOCUMENTS

| | | |
|---|---|---|
| 0201570 | 4/1989 | European Pat. Off. . |
| 1923218 | 11/1970 | Fed. Rep. of Germany . |
| 1550724 | 9/1971 | Fed. Rep. of Germany . |
| 2150674 | 6/1978 | Fed. Rep. of Germany . |
| 2703009 | 7/1978 | Fed. Rep. of Germany . |
| 2843183 | 4/1980 | Fed. Rep. of Germany . |
| 2162072 | 7/1980 | Fed. Rep. of Germany . |
| 3226231 | 1/1984 | Fed. Rep. of Germany . |
| 8429140 | 1/1985 | Fed. Rep. of Germany . |

Primary Examiner—Leslie A. Braun
Assistant Examiner—Khoi Q. Ta
Attorney, Agent, or Firm—Brumbaugh, Graves, Donohue & Raymond

[57] ABSTRACT

A multiple-step transmission for vehicle with a drive engine has several speed steps with corresponding pairs of gear wheels. The first speed step is arranged within the transmission so that it can also be used for transfer of driving force during shifting. In addition, special methods are described for carrying out shifting procedures with the aid of the highest or lowest gear.

2 Claims, 1 Drawing Sheet

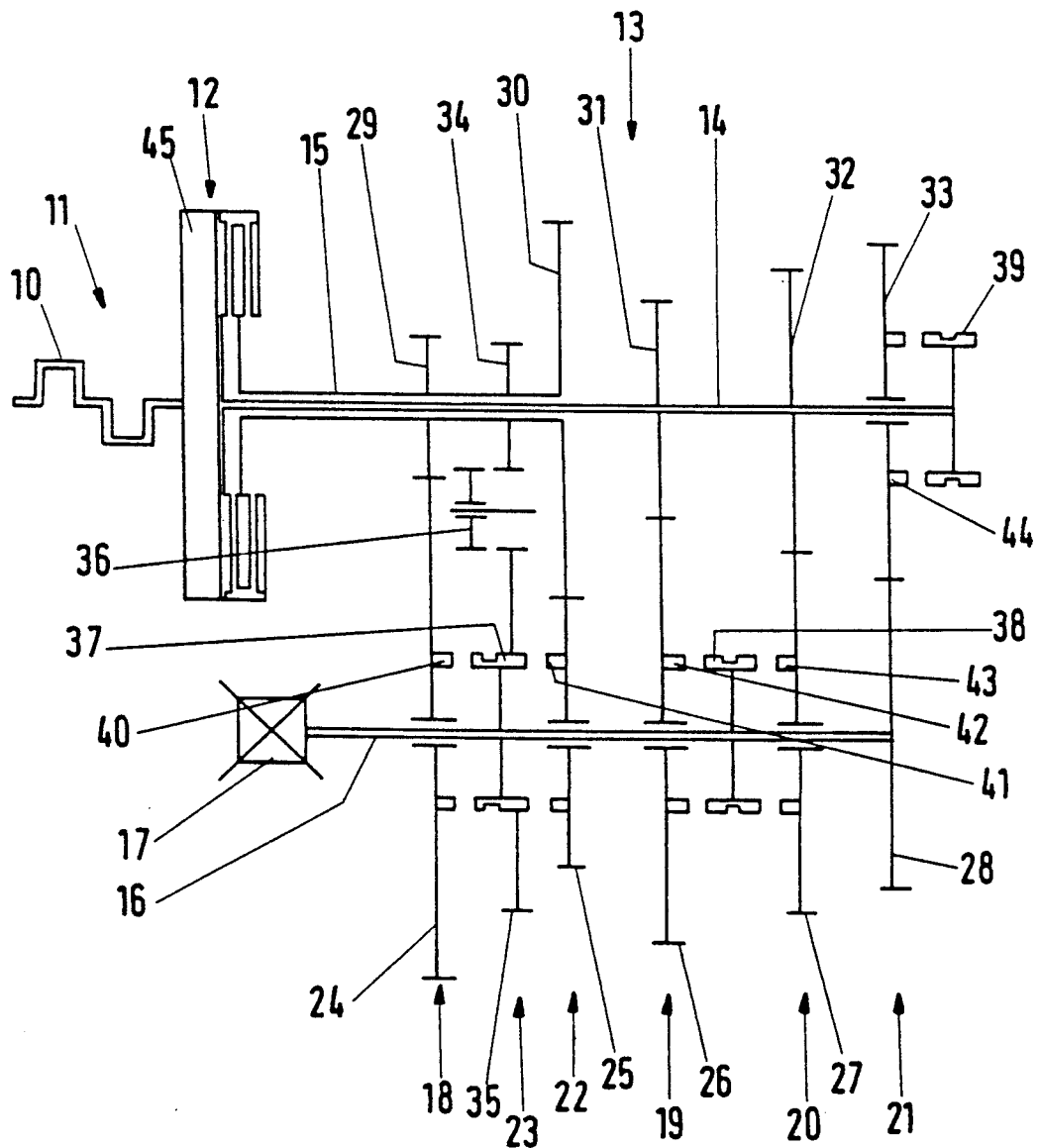

MULTIPLE STEP TRANSMISSION

BACKGROUND OF THE INVENTION

This invention relates to transmissions for vehicles with a drive engine and especially to such transmissions having multiple-step gear changes.

Such transmissions are useful in automatic transmission applications in which shifting times are determined and shifting procedures are initiated by an electronic control system taking particular parameters into account. Another area of application is in so-called semiautomatic transmissions having manual gear selection but providing automatic clutch actuation and a subsequent automatic additional shifting routine.

A multiple-step transmission with an additional highest-speed step is disclosed in European Patent No. 0,173,117 B1. In that case, during a shifting procedure, i.e., upon disengagement of the old gear and prior to engagement of the new gear, that additional highest-speed step, gear is connected through a single clutch to transfer a driving force to the driven axle of the vehicle. Starting procedure for the vehicle, too takes place with help of said additional highest-speed step gear and with, a correspondingly high slipping of the clutch. Only during a second step does engagement of the first gear take place.

SUMMARY OF THE INVENTION

Accordingly, it is an object of the present invention to provide a new and improved multiple-step transmission which overcomes the disadvantages of the prior art.

Another object of the invention is to provide an improved method of transmission of power or driving force during shifting procedures which includes alternate operation of a clutch.

These and other objects of the invention are attained by providing a transmission having a gear wheel for the lowest-speed affixed to a shaft member which is selectively connectable through a clutch to the transmission input shaft. The starting procedure for the vehicle is thus effected exclusively through the first gear. This results in a simpler and more rapid functional routine for the starting procedure with correspondingly better transmission of power, as well as very little clutch wear, which is equally important. In addition, the arrangement according to the invention makes it possible to use the lowest-gear step to support the shifting procedures, particularly in the engine-driven mode, i.e., when the vehicle is pushing the engine.

The method of the invention also provides optimal transmission of power or driving force during individual shifting procedures both in the engine-driven mode and in the engine-driving mode i.e., when the driving force of the engine is utilized for driving the vehicle. This is irrespective of whether the vehicle is accelerating or, on a steep incline, for example, is decelerated by the incline. Engine-driving is present in both cases. In contrast to this, the engine-driven mode defined as a state in which the vehicle drives the engine, again irrespective of whether acceleration of the vehicle is positive or negative In one advantageous embodiment of the method according to the invention, the actuation of the clutch and hence the clutch slippage may be controlled as a function of the driving force transmitted or of a variation in the engine speed caused by the slippage. In this way, not only is the transmission of driving force within the transmission optimally regulated but, at the same time, the heat generated by the clutch can be limited.

BRIEF DESCRIPTION OF THE DRAWING

Further objects and advantages of the invention will be apparent from a reading of the following description in conjunction with the accompanying drawing, which is a schematic diagram illustrating a representative multiple-step transmission according to the invention.

DESCRIPTION OF PREFERRED EMBODIMENTS

In the representative embodiment of the invention shown in the drawing, a crankshaft 10 of an engine 11 is connected by way of a clutch 12, which is a starting and separating clutch, to a multiple-step transmission 13. In the illustrated embodiment, the clutch 12 is arranged outside a transmission housing, not shown, but it is functionally associated with the transmission 13. On the transmission input side, a first partial shaft 14 is directly connected to the engine 11 through a flywheel 45, bypassing the clutch 12, while a second partial shaft 15 is connectable to the engine through the clutch 12. In the illustrated arrangement, the partial shaft 15 is a hollow shaft and is supported coaxially with the first partial shaft 14, which is an inner shaft. A transmission output shaft 16 is positioned parallel to the two partial shafts 14 and 15 and an axle differential 17, shown schematically, is provided at the output end of the shaft 16.

A plurality of speed steps, preferably five speed steps 18, 19, 20, 21, 22 and a reverse gear 23, are provided within the transmission 13. In the drawing, the numeral 18 designates the first speed step, the numeral 19 the second speed step, etc. Each speed step has a corresponding toothed gear wheel pair, consisting of one gear wheel fixed to a shaft and another gear wheel rotatably supported on a shaft. On the transmission output shaft 16 there are, in order from the axle differential 17, without taking the reverse gear into account, a rotatably supported gear wheel 24 of the first gear, a rotatably supported gear wheel 25 of the fifth gear, a rotatably supported gear wheel 26 of the second gear, a rotatably supported gear wheel 27 of the third gear and a fixed gear wheel 28 of the fourth gear. The arrangement of the gear wheels in the reverse gear 23 is explained below.

On the transmission input side, in order from the crankshaft 10, a fixed gear wheel 29 of the first gear and a fixed gear wheel 30 of the fifth gear are affixed to the second partial shaft 15 and a fixed gear wheel 31 of the second gear, a fixed gear wheel 32 of the third gear and a rotatably supported gear wheel 33 of the fourth gear are mounted on the first partial shaft 14.

A fixed gear wheel 34 of the reverse gear is mounted on the second partial shaft 15 between the first gear step 18 and the fifth gear step 22. An additional fixed gear wheel 35 of the reverse gear is mounted in like relative position on the transmission output shaft 16. The two fixed gear wheels 34 and 35 are connectable through an engagable pinion 36, which causes a reversal of the direction of rotation. The fixed gear wheel 35 is part of a sliding bushing 37, through which the rotatably mounted gear wheels 24 and 25 of the first and the fifth gear steps 18 and 22 can be brought into engagement alternatively with the transmission output shaft 16. Similarly, between the rotatably mounted gear wheels 26 and 27, there is a sliding bushing 38 for selective engagement of the second and third gear steps 19 and 20. Finally, the fixed gear wheel 28 of the fourth gear step 21 and the rotatably supported gear wheel 33 thereof are connectable through a special sliding bushing 39 with the first partial shaft 14 on the transmission input side. For adjusting unlike speeds, synchronizing devices 40 and 41 are provided at least between the rotatably supported gear wheels 24 and 25 of the first and fifth gear steps 18 and 22 and the corresponding sliding bushing 37. Additional synchronizing devices 42, 43 and 44 may be provided for synchronous engagement of the sliding bushings 38 and 39 with the rotatably supported gear wheels 26, 27 and 33 of the second, third and fourth gear steps. These synchronizing devices are not absolutely necessary. What is particularly important here is the locking effect.

The operation of the transmission is explained in detail below.

To start the vehicle, the rotatably supported gear wheel 24 of the first gear step 18 is first connected to the transmission output shaft 16 through the sliding bushing 37. The starting procedure then begins by applying pressure to the clutch 12 until friction engages the clutch to connect the engine through the first gear to the differential.

At the beginning of the shifting procedure from first to second gear, the clutch is again disengaged. The sliding bushing 37 actuating the first gear step 18 is thereby released from driving force and is separated from the rotatably supported gear wheel 24. The sliding bushing 37 then engages the rotatably supported gear wheel 25 of the fifth gear step 22. At this point, an adjustment in the speed of the second partial shaft 15 to the synchronous value of the fifth gear step is effected by the synchronizing device 41. After that, the clutch is activated for adjustment of speed and for driving-force-free engagement of the second gear step 19. This means that in this case the clutch 12 works only in slip operation and is not actuated all the way to friction lock. The speed of the engine side of the clutch 12 and/or of the flywheel 45 associated therewith is substantially greater than that corresponding to the synchronous speed of the engaged fifth gear step 22. At the same time, a difference in speed exists between the two partial shafts 14 and 15 because these are in each instance connected with different sides of the clutch. The clutch 12, working in slip operation, transmits a driving force, namely the driving force of the engine and the driving force resulting from a change in the speed of the rotating masses, in particular that of the flywheel 45, through the transmission. At the same time, an adjustment of speeds takes place. Depending upon load condition, either the speed of the transmission output shaft 16 and hence of the second partial shaft 15 increases as a result of the connection through the fifth gear and produces acceleration of the vehicle, or else the engine speed and hence the speed of the first partial shaft 14 decreases. After the synchronous speed for the second gear step 19 has been reached, the corresponding sliding bushing 38 is engaged. Then the clutch 12 is slowly disengaged, for damped buildup of torque. A connection now exists only through the first partial shaft 14, the second gear step 19 and the transmission output shaft 16.

Upon shifting from the second gear step 19 into the third gear step 20, the clutch 12 is first activated in the manner described above. As soon as the sliding bushing 38 is free of driving force, it is disengaged. After the synchronous speed for the third gear is reached, the sliding bushing 38 is engaged with the rotatably supported gear wheel 43. Thereafter, the clutch 12 is again disengaged.

A change of gears from the third gear step 20 to the fourth gear step 21 is effected in a manner analogous to the change from second to third gear.

Upon shifting from the fourth gear step 21 into the fifth gear step 22, the clutch 12 is activated first. As soon as the sliding bushing 39 is free of driving force, it is separated from the rotatably supported gear wheel 33. Lastly, the clutch 12 is completely engaged. Care must be taken to see that in the engaged second, third or fourth gear, the fifth gear is also engaged through the sliding bushing 37, although no connection exists through the clutch 12.

The operation thus far described concerns the engine-driving mode, in other words, the engine is driving the vehicle. Upon downshift in this type of operation from the fifth gear step 22 into the fourth gear step 21, the clutch 12 is first disengaged. Then a speed-up of the engine, which is separated from the load, takes place. Shortly before reaching the synchronous speed for the fourth gear step 21, the clutch 12 is activated, transmitting at least part of the moment of the engine and additional moments through the fifth gear step 22 and limiting the increase in engine speed. After reaching the synchronous speed for the fourth gear step, the corresponding sliding bushing 39 is engaged with the rotatably supported gear wheel 33. Lastly, the clutch 12 is again disengaged.

In the engine-driven mode, on shifting from the fourth gear step 21 to the third gear step 20, the clutch 12 is first activated so that a partial moment is transmitted through the fifth gear step. After the fourth gear is substantially free of driving forces, the sliding bushing 39 is disengaged from the rotatably supported gear wheel 33. Then the clutch 12 is again disengaged and the speed of the engine increases. Before reaching the synchronous speed for the third gear step, activation of the clutch 12 takes place for the transmission of driving force and for limiting the increase in engine speed. When the synchronous speed for the third gear step 20 is reached, the corresponding sliding bushing 38 is engaged with the rotatably supported gear wheel 43. Lastly, the clutch 12 is again disengaged.

In push operation, a shift from third into second gear takes place in a manner analogous to the previously described shifting of gears.

A shift from the second gear step 19 into the first gear step 18, in the engine-driven mode, again begins by activation of the clutch 12 for the transmission of driving force through the fifth gear step 22 and for adjustment of speed. As soon as the sliding bushing 38 is free of driving force from the gear wheel 26, it is disengaged and the clutch is then disengaged so that the engine speed again begins to increase. The sliding bushing 37 for the fifth gear step is disengaged and engaged with the rotatably supported gear wheel 24 of the first gear which is substantially free of driving force. Any difference in speed between the transmission output shaft 16 and the gear wheel 24 is balanced through the synchronizing device 40. Finally, the clutch 12 is engaged, usually when the synchronous speed is reached, so that driving force is transmitted.

On shift to the first, fifth or reverse gear step, any existing differences in speed are substantially eliminated by the synchronizing devices 40 and 41 when the sliding bushing 37 is engaged.

Shifting procedures in the engine-driven mode, for example, while travel through valleys with braking, take place with participation of the lowest, i.e., the first, gear step. In this type of operation, to start the shifting procedure, the driving force acting on the transmission output side, when the vehicle pushes the engine, must first be balanced by an opposing force. To accomplish this, for example, in downshift from the active fourth gear step, the first gear step is connected to the transmission output shaft 16 through the sliding bushing 37. Then the clutch 12 is activated for partial diversion of driving force through the first gear step. As soon as the fourth gear step has been rendered free of driving force, it is disengaged. Engagement of the third gear step takes place as soon as the corresponding gear wheel 27 of the third gear step has reached its synchronous speed.

Shifting from the fifth into the fourth gear, in the engine-driven mode, begins with release of the clutch 12. The sliding bushing 37 is then separated from the gear wheel 25 of the fifth gear step and connected with the gear wheel 24 of the first gear step. Lastly, the clutch is again activated. The sliding bushing 39 is connected with the gear wheel 33 of the fourth gear step 21 as soon as synchronous speed is reached. From the point of view of operational routine, downshift in the engine-driving corresponds to upshift in the engine-driving. In each instance, the last gear engaged, observing the conventional shifting sequence, is used for support during the shifting procedure. In upshift this is the fifth gear, while in downshift it is the first gear. The same rule applies to the downshift-in the engine-driving mode and upshift-in the engine-driving mode relationship.

For actuation of the clutch 12 and of the sliding bushings 37, 38 and 39, as well as of the pinion 36, there are provided actuating devices, not shown, which are coordinated through a control device, likewise not shown. Special attention is directed to the latter control device in connection with activation of the clutch 12 described above. There a driving force is intended to be transmitted which lies as much as possible between the force of the old gear and the force of the new gear. To obtain this, the variation in engine speed or in speed of the flywheel 45 may be detected and maintained at a predetermined value by a control circuit which controls the adjustment of the clutch slip. The relation between the standard value for the engine speed variation or gradient and the driving force transmitted through the clutch 12 is preferably stored as a characteristic in the control device.

Additional advantageous variations of the embodiment described above, not shown in the drawing, are possible. This concerns especially the arrangement of the clutch 12 which may be arranged between the first and the second partial shafts 14 and 15. In that case, a design with hollow and inner shafts is no longer necessary, but the clutch has to be modified and disposed within the transmission housing. It is to be noted as an advantage that the clutch then runs in the oil bath of the transmission, perhaps as a multiple-disk clutch. In addition, it is possible to place the clutch in the region of the transmission output shaft 16 and, at the same time, divide that shaft. Similarly, the illustrated arrangement of the fixed and rotatably supported gear wheels of the individual gear steps is not necessary. A special sliding bushing may alternatively be assigned to each gear step.

In another advantageous embodiment, not shown in the drawings, the first, fifth and reverse gears are arranged on an inner shaft at the transmission input side and the remaining gear steps are arranged correspondingly on a hollow shaft. At the same time, the inner shaft can be connected through the clutch to the engine while the hollow shaft is connected, optionally through a damping element such as a flywheel, directly to the engine, bypassing the clutching function.

Although the invention has been described herein with reference to specific embodiments, many modifications and variations therein will readily occur to those skilled in the art. Accordingly, all such variations and modifications are included within the intended scope of the invention.

I claim:

1. A multiple-step transmission for vehicles having a drive engine comprising a transmission input shaft, a transmission output shaft, a plurality of pairs of gear wheels assigned to corresponding individual gear speeds, at least one gear wheel of each pair being rotatably supported on a shaft, at least one of the transmission shafts being divided into at least first and second separately rotatable coaxial shafts, the second of the coaxial shafts carrying a gear wheel for the highest-speed step and a gear wheel for the lowest-speed step, and being connectable and disconnectable to and from the first of the coaxial shafts by a shiftable clutch, further including a gear wheel for a reverse gear step mounted on the second coaxial shaft.

2. A multiple-step transmission for vehicles having a drive engine comprising a transmission input shaft, a transmission output shaft, a plurality of pairs of gear wheels assigned to corresponding individual gear speeds, at least one gear wheel of each pair being rotatably supported on a shaft, at least one of the transmission shafts being divided into at least first and second separately rotatable coaxial shafts, the second of the coaxial shafts carrying a gear wheel for the highest-speed step and a gear wheel for the lowest-speed step, and being connectable and disconnectable to and from the first of the coaxial shafts by a shiftable clutch, and wherein gear wheels assigned to the individual gear speeds which are not a starting gear and not a highest gear are arranged on the first coaxial shaft and the first coaxial shaft is connected directly or through a damping device to the drive engine.

* * * * *

UNITED STATES PATENT AND TRADEMARK OFFICE
CERTIFICATE OF CORRECTION

PATENT NO. : 5,259,260

DATED : November 9, 1993

INVENTOR(S) : Arthur Schneider

It is certified that error appears in the above-identified patent and that said Letters Patent is hereby corrected as shown below:

Column 1, line 60, "mode" should read --mode is--;

Column 2, line 21, "partial" should read --partial or coaxial--;

Column 2, line 23, "partial" should read --partial or coaxial--;

Column 4, line 48, "push operation" should read --the engine-driven mode--;

Column 5, line 28, "engine-driving" should read --engine-driven mode--;

Column 5, line 29, "driving" should read --driving mode--;

Column 5, line 33, "in the" should read --in-the--;

Column 5, line 34, "in the engine-driving" should read --in-the engine-driven--;

Column 6, line 32, "a shaft" should read --the transmission output shaft--;

Column 6, line 35, "wheel" should read --wheel of the plurality of pairs of gear wheels--;

Column 6, line 35, "for the" should read --for a--;

Column 6, line 36, "for the" should read --for a--;

Column 6, line 39, "wheel" should read --wheel of the plurality of pairs of gear wheels--;

UNITED STATES PATENT AND TRADEMARK OFFICE
CERTIFICATE OF CORRECTION

PATENT NO. : 5,259,260
DATED : November 9, 1993
INVENTOR(S) : Arthur Schneider

It is certified that error appears in the above-identified patent and that said Letters Patent is hereby corrected as shown below:

Column 6, line 39, "reverse gear" should read --reverse speed--;

Column 6, line 46, "a shaft" should read --the transmission output shaft--;

Column 6, line 49, "wheel for the" should read --wheel of the plurality of pairs of gear wheels for a--;

Column 6, line 50, "for the" should read --for a--;

Column 6, line 54, "a starting gear" should read --the lowest speed step--;

Column 6, bridging lines 54-55, "a highest gear" should read --the highest speed step--;

Column 6, line 56, "directly" should read --directly to--.

Signed and Sealed this

Tenth Day of May, 1994

Attest:

BRUCE LEHMAN

Attesting Officer   Commissioner of Patents and Trademarks